(12) United States Patent
Scrivano

(10) Patent No.: US 11,886,605 B2
(45) Date of Patent: Jan. 30, 2024

(54) DIFFERENTIATED FILE PERMISSIONS FOR CONTAINER USERS

(71) Applicant: Red Hat, Inc., Raleigh, NC (US)

(72) Inventor: Giuseppe Scrivano, Milan (IT)

(73) Assignee: RED HAT, INC., Raleigh, NC (US)

( * ) Notice: Subject to any disclaimer, the term of this patent is extended or adjusted under 35 U.S.C. 154(b) by 233 days.

(21) Appl. No.: 16/587,522

(22) Filed: Sep. 30, 2019

(65) Prior Publication Data

US 2021/0097190 A1    Apr. 1, 2021

(51) Int. Cl.
*G06F 21/62* (2013.01)
*H04L 9/40* (2022.01)

(52) U.S. Cl.
CPC ........ *G06F 21/6218* (2013.01); *H04L 63/104* (2013.01)

(58) Field of Classification Search
CPC ............................ H04L 63/104; G06F 21/6218
USPC .......................................................... 726/28
See application file for complete search history.

(56) References Cited

U.S. PATENT DOCUMENTS

| | | | | |
|---|---|---|---|---|
| 5,572,711 A * | 11/1996 | Hirsch | ..................... | G06F 21/31 703/26 |
| 5,664,098 A * | 9/1997 | Bianchi | ............... | G06F 9/45537 713/168 |
| 5,815,574 A * | 9/1998 | Fortinsky | ............ | G06F 21/6218 713/153 |
| 6,081,807 A * | 6/2000 | Story | ...................... | G06F 16/10 709/219 |
| 6,427,020 B1 * | 7/2002 | Rhoads | ................. | G06T 1/0021 283/901 |
| 7,257,836 B1 * | 8/2007 | Moore | ................ | H04W 12/069 726/19 |
| 7,587,570 B2 * | 9/2009 | Sarkar | .................... | G06F 3/0605 711/170 |
| 7,680,999 B1 * | 3/2010 | Morris | ................ | G06F 9/30076 711/163 |

(Continued)

FOREIGN PATENT DOCUMENTS

| | | | | |
|---|---|---|---|---|
| CN | 110120940 A | * | 8/2019 | ............. G06F 16/17 |
| RU | 2583759 C1 | * | 5/2016 | |
| WO | WO-9613790 A1 | * | 5/1996 | ........... G06F 19/322 |

OTHER PUBLICATIONS

Wurster, Glenn, and Paul C. Van Oorschot. "A control point for reducing root abuse of file-system privileges." In Proceedings of the 17th ACM conference on Computer and communications security, pp. 224-236. 2010. (Year: 2010).*

(Continued)

*Primary Examiner* — Luu T Pham
*Assistant Examiner* — Walter J Malinowski
(74) *Attorney, Agent, or Firm* — HAYNES AND BOONE, LLP

(57) ABSTRACT

Systems, methods, and machine-readable instructions stored on machine-readable media are disclosed for copying a first permission of a file to a second permission of the file, wherein the file is stored on a host file system. The first permission is changed to a third permission. A request is received to access the file from a container file system. In response to the request and before providing the container file system with access to the file, changing the third permission to the second permission. The file is provided to the container file system based on the second permission.

19 Claims, 2 Drawing Sheets

(56) References Cited

U.S. PATENT DOCUMENTS

| | | | |
|---|---|---|---|
| 8,285,758 B1* | 10/2012 | Bono | G06F 16/185 707/822 |
| 8,832,151 B2 | 9/2014 | Saha et al. | |
| 8,881,144 B1* | 11/2014 | Banerjee | G06F 3/0631 718/1 |
| 9,069,436 B1* | 6/2015 | Fieweger | G06F 16/9535 |
| 9,348,819 B1* | 5/2016 | Emelyanov | G06F 16/113 |
| 9,479,509 B2 | 10/2016 | Zeuthen | |
| 9,699,114 B1* | 7/2017 | Hintermeister | H04L 47/805 |
| 10,007,779 B1* | 6/2018 | McClintock | G06F 21/31 |
| 10,122,757 B1* | 11/2018 | Kruse | H04L 63/10 |
| 10,162,980 B1* | 12/2018 | Bernotavicius | G06F 21/6218 |
| 10,305,747 B2 | 5/2019 | Shahab et al. | |
| 10,986,131 B1* | 4/2021 | Kruse | H04L 63/10 |
| 2001/0054068 A1* | 12/2001 | Modiano | G06F 40/174 709/203 |
| 2002/0178377 A1* | 11/2002 | Hemsath | G06F 21/6218 726/2 |
| 2004/0133540 A1* | 7/2004 | Saake | G06F 16/113 |
| 2004/0205152 A1* | 10/2004 | Yasuda | G06F 16/184 709/217 |
| 2004/0221234 A1* | 11/2004 | Imai | H04L 63/0428 715/256 |
| 2004/0225659 A1* | 11/2004 | O'Brien | G06F 16/1824 |
| 2005/0044399 A1* | 2/2005 | Dorey | G06F 21/6236 726/26 |
| 2007/0157203 A1* | 7/2007 | Lim | H04L 63/20 718/100 |
| 2007/0168394 A1* | 7/2007 | Vivekanand | H04L 67/28 |
| 2007/0208949 A1* | 9/2007 | Lu | G06F 21/34 713/186 |
| 2008/0109883 A1* | 5/2008 | Hernoud | G06F 16/29 726/5 |
| 2010/0037235 A1* | 2/2010 | Larimore | G06F 9/48 719/312 |
| 2010/0082371 A1* | 4/2010 | Kamp | G16H 10/60 705/2 |
| 2010/0132053 A1* | 5/2010 | Chishima | G06F 21/74 726/30 |
| 2010/0146279 A1* | 6/2010 | Lu | G06F 13/10 713/172 |
| 2010/0242037 A1* | 9/2010 | Xie | H04L 67/34 717/178 |
| 2011/0153693 A1* | 6/2011 | Sakai | G06F 3/067 707/823 |
| 2011/0161370 A1* | 6/2011 | Miyamae | G06F 16/10 707/783 |
| 2011/0167036 A1* | 7/2011 | Liebman | G11B 27/329 707/608 |
| 2011/0213971 A1* | 9/2011 | Gurel | H04L 9/3271 713/165 |
| 2011/0314392 A1* | 12/2011 | Howarth | G06F 21/6218 715/753 |
| 2013/0346874 A1* | 12/2013 | Wallace | G16H 30/20 715/744 |
| 2014/0101310 A1* | 4/2014 | Savage | H04L 43/00 709/224 |
| 2014/0164984 A1* | 6/2014 | Farouki | G06F 3/0485 715/784 |
| 2014/0280955 A1* | 9/2014 | Stuntebeck | H04L 63/20 709/226 |
| 2014/0325640 A1* | 10/2014 | Aggarwal | G06F 21/31 726/18 |
| 2015/0074819 A1* | 3/2015 | Borenstein | G06F 16/174 726/27 |
| 2015/0235047 A1 | 8/2015 | Lenzmeier et al. | |
| 2016/0048522 A1* | 2/2016 | Wilcock | G06F 16/113 707/662 |
| 2016/0098573 A1* | 4/2016 | Yankovskiy | G06F 16/283 726/27 |
| 2016/0219073 A1* | 7/2016 | Mathur | G06F 21/53 |
| 2016/0359859 A1* | 12/2016 | Capone | G06F 21/6218 |
| 2016/0364236 A1* | 12/2016 | Moudgill | G06F 9/30123 |
| 2017/0199824 A1* | 7/2017 | Bennatan | G06F 3/065 |
| 2017/0269978 A1* | 9/2017 | Engel | G06F 9/541 |
| 2018/0101691 A1* | 4/2018 | Das | H04L 63/102 |
| 2018/0157860 A1* | 6/2018 | Nair | G06F 9/45558 |
| 2018/0204017 A1* | 7/2018 | Panchbudhe | G06F 21/602 |
| 2018/0219877 A1* | 8/2018 | Hsu | G06F 21/62 |
| 2018/0314821 A1* | 11/2018 | Brady | G06F 9/45558 |
| 2018/0322307 A1* | 11/2018 | Viswanathan | G06F 21/31 |
| 2019/0004841 A1* | 1/2019 | Starks | G06F 9/5016 |
| 2019/0007415 A1* | 1/2019 | Kliger | H04L 63/101 |
| 2019/0007457 A1* | 1/2019 | Arumugam | H04L 63/08 |
| 2019/0065745 A1* | 2/2019 | Araujo | G06F 21/57 |
| 2019/0068641 A1* | 2/2019 | Araujo | G06F 21/566 |
| 2019/0158497 A1* | 5/2019 | Diaz Cuellar | H04L 63/108 |
| 2019/0274018 A1* | 9/2019 | Mosenia | H04W 4/48 |
| 2020/0004977 A1* | 1/2020 | Araujo | G06F 16/1734 |
| 2020/0019695 A1* | 1/2020 | Sovio | G06F 21/602 |
| 2020/0137157 A1* | 4/2020 | Joseph | H04L 67/1097 |
| 2020/0204463 A1* | 6/2020 | Guan | H04L 63/1441 |
| 2020/0236799 A1* | 7/2020 | Roth | H05K 5/0221 |
| 2020/0251118 A1* | 8/2020 | Sunkavally | G10L 17/04 |
| 2020/0278793 A1* | 9/2020 | Jiang | G06F 3/0608 |
| 2020/0326984 A1* | 10/2020 | Wu | G06F 16/17 |
| 2020/0372002 A1* | 11/2020 | Cronan | G06F 16/185 |
| 2021/0342092 A1* | 11/2021 | Wu | G06F 21/53 |

OTHER PUBLICATIONS

Zhang, Mingwei, Daniel Marino, and Petros Efstathopoulos. "Harbormaster: Policy enforcement for containers." In 2015 IEEE 7th International Conference on Cloud Computing Technology and Science (CloudCom), pp. 355-362. IEEE, 2015. (Year: 2015).*

Gorski III, Sigmund Albert, and William Enck. "Arf: identifying re-delegation vulnerabilities in android system services." In Proceedings of the 12th conference on security and privacy in wireless and mobile networks, pp. 151-161. 2019. (Year: 2019).*

Sarkale, Vivek Vijay, Paul Rad, and Wonjun Lee. "Secure cloud container: Runtime behavior monitoring using most privileged container (mpc)." In 2017 IEEE 4th International Conference on Cyber Security and Cloud Computing (CSCloud), pp. 351-356. IEEE, 2017. (Year: 2017).*

Kaur, Navneet, and Maninder Singh. "Improved file system security through restrictive access." In 2016 International Conference on Inventive Computation Technologies (ICICT), vol. 3, pp. 1-5. IEEE, 2016. (Year: 2016).*

Thain, Douglas, Christopher Moretti, Paul Madrid, Philip Snowberger, and Jeffrey Hemmes. "The consequences of decentralized security in a cooperative storage system." In Third IEEE International Security in Storage Workshop (SISW'05), pp. 12-pp. IEEE, 2005. (Year: 2005).*

Sinha, Pradeep K. Distributed operating systems: concepts and design. Distributed File Systems. PHI Learning Pvt. Ltd., pp. 421-495, 1998. (Year: 1998).*

Wadhwa; Priya, Introducing Kaniko: Build Container Images in Kubernetes and Google Container Builder Without Privileges; Apr. 16, 2018; 4 pages. https://cloud.google.com/blog/products/gcp/introducing-kaniko-build-container-images-in-kubernetes-and-google-container-builder-even-without-root-access.

Priedhorsky; Reid: Charliecloud: unprivileged Containers for User-Defined Software Stacks in HPC; Aug. 10, 2017; 12 pages https://permalink.lanl.gov/object/tr?what=info:lanl-repo/lareport/LA-UR-16-22370.

GitHub Inc.; Buildah; 2019. https://github.com/containers/buildah/blob/master/docs/buildah-from.md.

* cited by examiner

DIFFERENTIATED FILE PERMISSIONS FOR CONTAINER USERS

FIELD OF DISCLOSURE

The present disclosure generally relates to data processing, database and file management or data structures, and more particularly to right of a user or host or group of users or group of hosts to access specific parts of a storage system.

BACKGROUND

Containers are lightweight mechanisms for isolating running processes so that they are limited to interacting only with their designated resources. Many application instances can be running in containers on a single host without visibility into one anothers' processes, files, network, and so on. Typically, each container provides a single service (often called a "micro-service"), such as a web server or a database, though containers can be used for arbitrary workloads.

Containers may be used to ensure consistency across multiple development environments. For example, software applications may be packaged into container images that include collections of objects and metadata. An image is a binary that includes all of the requirements for running a container, as well as metadata describing its needs and capabilities. Images, which may be read-only, may contain files such as packages, scripts, libraries, settings, etc. These files allow the image to be run as a standalone application in a container.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: storing a file with a first permission in a host file system; creating an extended attribute corresponding to the file and storing a second permission in the extended attribute, wherein the second permission is equivalent to the first permission; changing the first permission to a third permission, wherein the first permission and the third permission are different; receiving a remote request to access the file, before providing the file to the remote requester, changing the third permission to the stored second permission; and providing the file to the remote requester with the second permission. Other examples of this aspect include corresponding computer systems, apparatus, and computer programs recorded on one or more computer storage devices, each configured to perform the actions of the methods.

One general aspect includes a method including: copying a first permission of a file to a second permission of the file, wherein the file is stored on a host file system; changing the first permission to a third permission; receiving, from a container file system, a request to access the file; in response to the request and before providing the container file system with access to the file, changing the third permission to the second permission; and providing the container file system with access to the file based on the second permission. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: creating an extended attribute of a file stored in a host file system and storing a second permission in the extended attribute, wherein the second permission is copied from a first permission associated with the file; changing the first permission to a third permission; and in response to receiving a request from a container user to access the file, converting the third permission to a converted permission without writing to the third permission, such that a user of the host file system is provided the file using the third permission and the container user is provided the file using the converted permission. Other examples of this aspect include corresponding computer systems, apparatus, and computer programs recorded on one or more computer storage devices, each configured to perform the actions of the methods.

DETAILED DESCRIPTION

Figure 1:
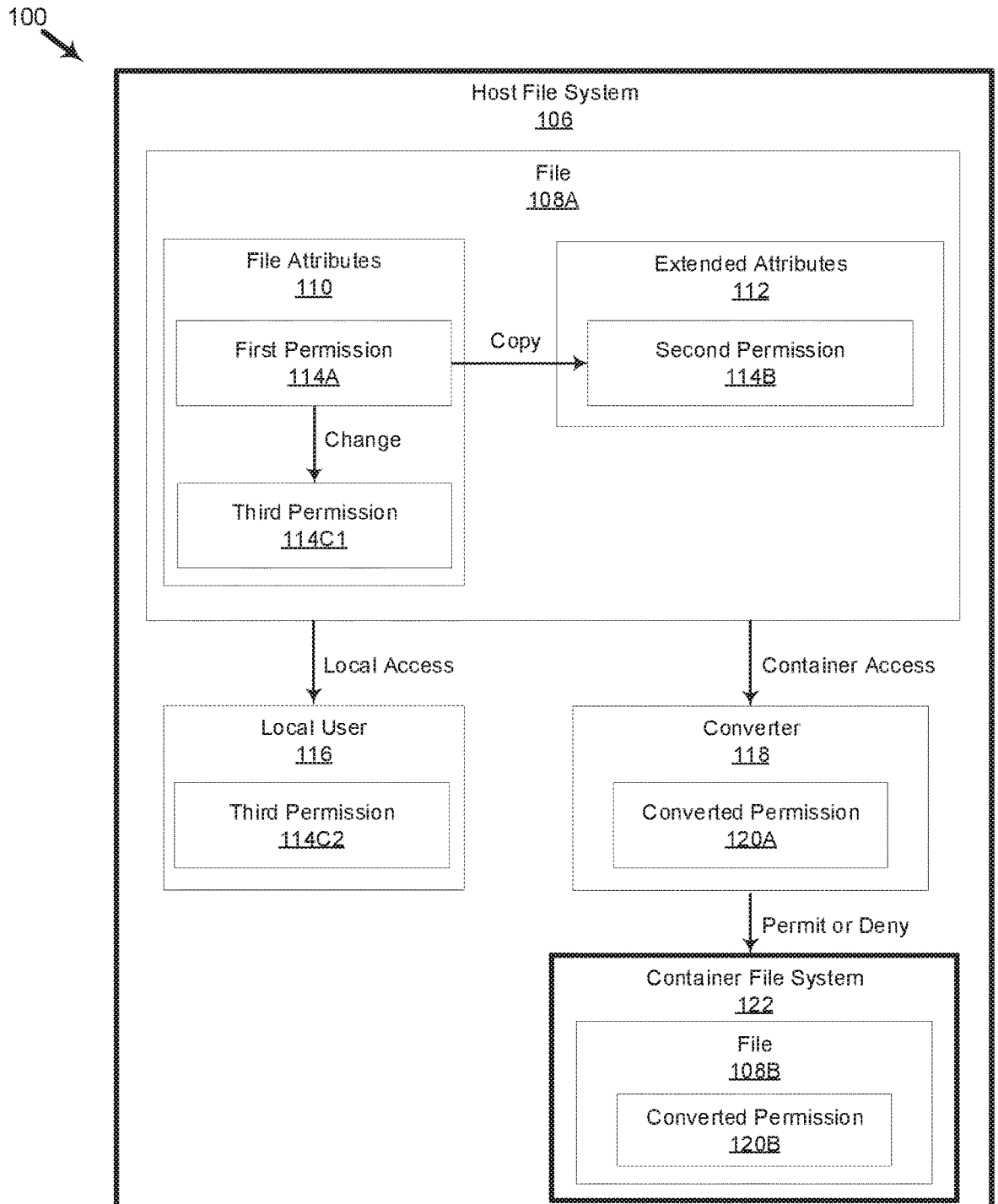
FIG. 1 is an organizational diagram illustrating a system for providing a file or directory with a first set of permissions to users accessing the file or directory via a host file system, and a second set of permissions to users accessing the file or directory via a container file system.
Figure 1:
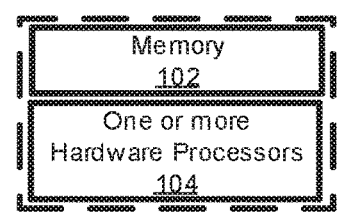

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A host may assign one or more permissions to one or more users or groups of users, such as owner permissions, group permissions, and other (world) permissions. Owner permissions determine the types of actions that an owner of a file or directory can perform. Group permissions determine the types of actions that a member of a group to which the file or directory belongs can perform. Other (world) permissions or public user permissions determine the types of actions that all other users can perform on the file or directory. Permissions may include a read permission, a write permission, and an execute permission. Such permissions may be granted with respect to files in a file access mode or to directories in a directory access mode. A user with file read permission is able to view the contents of a file. A user with file write permission is able to modify or remove the content of a file. A user with file execute permission is able to run the file as a program. A user with directory read permission is able to access the directory and read the file names in the directory. A user with directory write permission is able to add or delete files from the directory. A user with directory execute permission is able to access the directory and execute commands within the directory, such as to list the contents of the directory or to change the current working directory to a different directory using the appropriate commands.

Permissions may be indicated using a string of characters. In some examples, an initial character (1), e.g., a dash "-" may be used to indicate that the entry is a file, while a letter, e.g., "d" may be used to indicate that the entry is a directory. The first three characters (2-4) indicate the owner's permissions. The next three characters (5-7) indicate the group's permissions. The last three characters (8-10) indicate the permissions for everyone else. Thus, the permission string "-rwxr--r--" corresponds to permissions for a file, as indicated by the dash ("-") prefix. The permission string further indicates that the file's owner can read, write, and execute the file (first triad in "-rwxr--r--"); while group members can only read the file (second triad in "-rwxr--r--"); and that public users can only read the file (third triad in "-rwxr--r--").

One or more containers may be executed on a host. Such containers may be managed by a container operating system or file system. In some examples, the container file system may attempt to read, write, or execute a file or a directory in the host file system. For example, a user of the container file system may attempt to create a container image using files stored on the host file system. Since permissions set on files or directories in a host file system are identical from the perspective of the host file system as well as the container file system, a container user who only has public user privileges would have the same permissions applied to his or her access as a public user on the host file system. For example, the host file permissions may be "-rwx------" or file mode 700. Mode 700 precludes access to anyone but the owner of the file or directory. Thus, the user of the container file system, who may only have the privileges of a public user, would not be able to access the file on the host system.

In order for a public user of the container file system or host file system to build a container image using the file on the host file system, the user of the container file system or host file system would need to pull a copy of the file from a repository that is accessible to the user, such as from a public online repository of container image files. Additionally, the pulled file needs to be stored on a user space of the host file system (if the user is a user of the host file system) or a user space of the container file system (if the user is a user of the container file system). Such pulling and copying of files to build a container image, when the file is already present on the host file system, is inefficient and wastes system resources.

In the example above, a simple solution to make the file accessible to public users is to change the file permissions on the host. For example, "-rwx------" may be changed to "-rwxr-xr-x," which would allow group members and public users to read and execute the file. However, because the container file system accesses the file with the privileges of a public user, the container file system would also be able to read and execute the file. Such broad access to the container file system may result in negative consequences as the users of container file system would have the permission to execute files on the host file system.

To ensure that unprivileged users of a container file system are restricted from reading, writing, or executing a file, it is desirable to grant a separate, broader set of permissions to public users of the host file system that is not also applicable to unprivileged users of the container file system. Such differentiation would afford unprivileged users of a host file system the conveniences of a higher level of access to the host files and directories (e.g., read and execute files on the host), while securing the host files and directories against excessive, unnecessary, or unauthorized accesses by unprivileged users of the container file system.

Various examples described herein provide techniques to provide a file or directory with a first set of permissions to users accessing the file or directory via a host file system, and a second set of permissions to users accessing the file or directory via a container file system. As a high-level overview, the techniques include storing a file's or directory's original permissions in an extended attribute of the file or directory. For example, the file's or directory's original permissions may provide full access (read, write, execute) to only owners of the file or directory, and read-only access to group members and public users. The file's or directory's permissions are then changed and stored as normal, for example, in the inode, to provide the host file system users with the desired level of access. However, when a user of a container file system attempts to access the file or directory, a converter is used to convert the permissions of the file or directory to a different set of permissions that is appropriate for the users of the container file system.

In more detail, prior to effecting a change in a permission of a file or directory, the original permission then in effect is stored in an extended attribute of the file or directory. In some examples, the request to change a file's or directory's permissions causes the original permissions to be stored in the extended attribute of the file or the directory.

The new permissions may provide more access rights to users of the host file system. For instance, the new permissions may be set such that public users of the host file system can read and execute a file or directory, and thus build container images using the file or directory without creating a separate copy of the file or directory. Significant time and storage space may be saved by applying such a permission scheme, since copies of the file or directory no longer need to be stored in the user space of each user.

However, because the new permissions also apply to public users of the container file system, security concerns may arise. To address such concerns, a converter is used to convert the permissions of the file or directory before the file or directory is provided to the container file system to permissions that are appropriate for the container file system. Such permissions may be the original permissions stored in the extended attribute, as described above, or a separate set of permissions preconfigured for access requests by users of container file systems. Such preconfigured permissions may be stored in a data structure and applied based on an applicable policy, such as an access control list, a security policy, an access policy, a user privilege log, etc.

Thus, when a user of the container file system accesses the file or directory, the user of the container file system is not provided the file or directory with the new permissions (e.g., granting public users the permission to read and execute), but is instead provided the file or directory with the appropriate level of permissions for users of container file systems. In some examples, the file is provided with the original permissions stored in the extended attribute (e.g., granting public users read-only permission). Thus, as a result of the conversion, users of the same class (e.g., public users) of the host file system and users of the container file system are presented the same file or directory, but with different access permissions.

In more detail regarding the converter, the converter may be software executing on the host file system, or a separate computer system including a hardware processor and non-transitory memory with instructions stored thereon, interposed between the host file system and the container file system. In some examples, the converter is part of the host file system. In some examples, the converter is part of the container file system. In some examples, the converter has the same privileges as a privileged user of the host file system. In some examples, the converter has the same privileges as an unprivileged or public user of the host file system. Further, the converter may process requests to access files or directories on the host file system made, for example, by a container user. In some examples, when a container user requests to access a file or directory on the host file system, the converter reads the payload, metadata, and permission mask of the file or the directory into memory. The permission mask may contain the file's or directory's current permissions, which may be stored in the file's or directory's attributes, such as in an inode. In some examples, the converter reads the file's or directory's payload and metadata into memory, but not the permission mask. In some examples, the converter reads the file's or directory's payload, metadata, and permission mask into memory, but the file's or directory's permission mask in memory is overwritten with the permissions stored in the file's or directory's extended attributes.

In some examples, the converter does not perform such overwriting, but instead presents to the container file system the file or directory permissions stored in the extended attribute as the file's or directory's permissions. Thus, in some examples, the converter reads the extended attribute of the file or directory (in the example above, containing the original public user read-only file or directory permissions) into memory instead of, or as a replacement of, the file's or directory's permission mask. Thus, in response to an access request from a container, the converter may read and pass to the container the payload and metadata of the file or directory, together with the extended attributes of the file or directory containing permissions other than the current permissions of the file or directory applicable to non-container users locally accessing the file or directory from the host file system.

Thus, from the perspective of the user of the container file system, the file's or directory's permissions may be "-rwx------" or mode 700, while from the perspective of the user of the host file system, the file's or directory's permissions may be "-rwxr-xr-x" or mode 755. Accordingly, the file or directory is publicly readable and executable by users of the host file system, but not accessible by users of the container file system.

The above example describing a scenario where unprivileged users of a host file system are granted more permissions than unprivileged users of a container file system is illustrative only. Any permutation or combination of permissions may be set for any number of user classes (e.g., owner, group member, public, etc.), and for any number or type of user operations (e.g., read, write, execute, etc.). Naturally, the techniques can also be applied to provide privileged users of a host file system with more permissions than privileged users of a container file system; to provide privileged or unprivileged users of a host file system with fewer permissions than users of a container file system; or to provide privileged or unprivileged host file system users with the same level of permissions as container users.

FIG. 1 is an organizational diagram illustrating a system 100 for providing a file or directory with a first set of permissions to users accessing the file or directory via a host file system, and a second set of permissions to users accessing the file or directory via a container file system, according to aspects of the present disclosure.

The system 100 includes a non-transitory memory 102 and one or more hardware processors 104 coupled to the non-transitory memory 102. In the present example, the one or more hardware processors 104 executes instructions from the non-transitory memory 102 to perform operations for: copying a first permission 114A of a file 108A to a second permission 114B of the file 108A, wherein the file 108A is stored on a host file system 106; changing the first permission 114A to a third permission 114C1; receiving, by a container file system 122, a request to access the file 108A; in response to the request and before providing the container file system 122 with access to the file 108A, changing the third permission 114C1 to the second permission 114B; and providing the container file system 122 with access to the file 108A based on the second permission 114B. System 100 may also include additional elements, for example, providing local access to the file 108A to a local user 116 of the host file system 106 according to the third permission 114C2, and providing the file 108B to a container file system 122 with a converted permission 120B via a converter 118. In some examples, converter 118 converts the third permission 114C1 to a converted permission 120A. System 100 may also be used in conjunction with method 200 described with respect to FIG. 2.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The system 100 includes a bus or other communication mechanism for communicating information data, signals, and information between the non-transitory memory 102, the one or more hardware processors 104, and the various components of system 100. For example, the various components may include a data storage device, which may be local to the system 100 or communicatively coupled to the system 100 via a network interface. Components may further include input/output (I/O) components such as a keyboard, mouse, touch interface, and/or camera that process user actions such as key presses, clicks, taps, and/or gestures and sends a corresponding signal to the bus or other communication mechanism. The I/O component may also include an output component such as a display.

In some examples, a user may use the I/O component to command the host file system 106, via a user interface such as a graphical user interface, a command line interface, or any other interface the user may use to communicate with system 100, to directly or indirectly change a first permission 114A of a file 108A stored on the host file system 106. In some examples, the first permission 114A is changed by a software program, for example, based on the occurrence of a condition. The file 108A may be associated with an inode, and the first permission 114A may be stored in the associated inode of the host file system 106. In some examples, the file permission 114A is stored as part of the file attributes 110 of the file 108A.

For ease of discussion, assume that a privileged user of the host file system enters a command which causes the first permission 114A to be changed to a third permission 114C1. In some examples, such a command also triggers the host file system 106 to copy the first permission 114A to a second permission 114B prior to changing the first permission 114A to the third permission 114C1. In some examples, the first permission 114A is stored or backed up as second permission 114B at regular or irregular intervals. Any other condition or trigger may be used to cause the first permission 114A to be stored as second permission 114B. In some examples, the first permission 114A and the second permission 114B are the same, while the first permission 114A and the third permission 114C1 are different. In some examples, the second permission 114B is stored in extended attributes 112 of the file 108A. In some examples, the second permission 114B is stored in the converter 118.

As an example, the first permission 114A may permit only owners to read, write, and execute the file 108A. Thus, group members and public users may not be able to read, write, or execute the file 108A under the first permission 114A. To permit group members and public users to read, write, or execute the file 108A, the first permission 114A may be changed to third permission 114C1. For example, third permission 114C1 may permit group members and public users to read and execute, but not write to, the file 108A. Because the first permission 114A may be copied to second permission 114B before the first permission 114A is changed to third permission 114C1, second permission 114B may also permit only owners to read, write, and execute the file 108A.

In some examples, the third permission 114C1 overrides, overwrites, or updates the first permission 114A. Thus, the permission of the file 108A that is stored in the inode may be changed from first permission 114A to third permission 114C1. Similarly, the permission of the file 108A that is stored in the file attributes 110 may be changed from first permission 114A to third permission 114C1. Thus, any requests to access the file 108A after the first permission 114A is changed to third permission 114C1 will be determined using third permission 114C1.

For example, a local user 116 of the host file system 106 may attempt to access the file 108A from the user space of the local user 116. Under first permission 114A as described in the example above (file mode 700), the local user 116 may not have the permission to even read the file 108A. However, under third permission 114C1 as described in the example above (file mode 755), the local user 116 may read and execute the file 108A. Since the third permission 114C1 determines how the local user 116 accesses the file 108A, it can be said that the local user 116 accesses the file using the third permission 114C2 (the "C2" suffix is used to denote the permission level of the file actually provided to the local user 116). Third permission 114C2 is otherwise identical to third permission 114C1. Thus, the local user 116 may read and execute the file 108A, to, for example, build images using the file 108A on the host file system 106 without pulling a copy of the file 108A from a repository or creating a copy of the file 108A in his or her user space, which saves time and computing resources.

In some examples, a user of a container file system 122 may also attempt to access the file 108A. In some examples, the user of the container file system 122 may be an unprivileged user that is neither an owner nor a group member of the file 108A. Thus, under first permission 114A as described in the example above (file mode 700), the user of the container file system 122 may not have the permission to even read the file 108A. However, under third permission 114C1 as described in the example above (file mode 755), the container user may read and execute the file 108A. Thus, the convenience and advantages offered by third permission 114C1 to (unprivileged) local user 116 may be outweighed by the security threats introduced by permitting (unprivileged) users of container file system 122 to also read and execute the file 108A.

To prevent such unbridled access by users of container file system 122 under third permission 114C1, a converter 118 may be used. Converter 118 changes the current permission of the file 108A in the host file system 106 (e.g., third permission 114C1) to a converted permission 120A when a container file system 122 attempts to access the file 108A. Additionally, the converter 118 may convert any of the permissions in the host file system 106, such as second permission 114B to converted permission 120A.

In some examples, the converter 118 is part of the host file system 106. In some examples, the converter 118 is part of the container file system 122. In some examples, the converter 118 is part of the host file system 106 but not part of the container file system 122. In some examples, the converter 118 has the same privileges as a privileged user of the host file system 106. In some examples, the converter 118 has the same privileges as an unprivileged user of the host file system 106. Further, the converter 118 may process requests to access files such as file 108A or directories on the host file system 106. Such requests may be made, for example, by a container user and the request may be received and processed by container file system 122. In some examples, when a container user attempts to access file 108A or directory on the host file system 106, the container file system 122 or the host file system 106 sends a request, sets a flag, or otherwise causes the converter 118 to read the payload, metadata, or permission mask of the file or the directory into memory 102. The permission mask may contain the file's 108A or directory's current permissions, such as third permission 114C1, which may be stored in the file's 108A or directory's attributes, such as in an inode. In some examples, the converter 118 reads the file's 108A or directory's payload and metadata into memory 102, but not third permission 114C1. In some examples, the converter 118 reads the file's 108A or directory's payload, metadata, and third permission 114C1 into memory 102, and overwrites third permission 114C1 with the permissions stored in the file's 108A or directory's extended attributes 112, such as second permission 114B.

In some examples, instead of or in addition to reading and overwriting permissions, the converter 118 presents the second permission 114B stored in the extended attributes 112 as the file's or directory's permissions to the container file system 122. Thus, in some examples, the converter 118 reads the extended attribute 112 of the file 108A or directory containing second permission 114B into memory 102 instead of, or as a replacement of, third permission 114C1. Thus, in response to an access request from a container, the converter 118 may read and pass to the container the payload and metadata of the file 108A or directory, together with the extended attributes 112 of the file or directory containing permissions (e.g., second permission 114B) other than the current permissions (e.g., third permission 114C1) of the file 108A or directory applicable to non-container users locally accessing the file 108A or directory from the host file system 106.

Thus, in some examples, the converter 118 reads or retrieves second permission 114B stored in extended attributes 112 of the file 108A, stores the second permission 114B in memory 102 as converted permission 120A, and passes the converted permission 120A together with the payload and metadata of the file 108A to the container or container file system 122. In some examples, a default set of permissions is stored in the converter 118 and applied as converted permission 120A to requests coming from containers or container file system 122. Converted permission 120A may thus refer specifically to such permissions, or more generally to any file 108A or directory permission applied, modified, changed, added, removed, or passed by the converter 118 causing the file's 108A or directory's permission to be different from the file 108A's permission otherwise applicable to non-container users, such as local user 116, accessing the file 108A from the host file system 106. Converted permission 120A may, for example, permit public users only to read but not execute file 108A, to read and execute the file 108A, or any permutation or combination of permissions that can be set (e.g., with respect to user class and permissible user actions).

Converted permission 120A may provide more, less, or the same permissions as third permission 114C1. In some examples, the converted permission 120A may be the same as second permission 114B and provides less access rights than third permission 114C1 of the file 108A in the host file system 106. In some examples, the converted permission 120A provides greater access rights than the current permission of the file 108A in the host file system 106. In short, as a result of the conversion, the ability of a user of the container file system 122 to read, write, or execute the file 108A may be different from a similarly situated user of the host file system 106. For example, a public user of the host file system 106, accessing the same file 108A, may have more permissions to access the file 108A than a public user of the container file system 122.

In response to the container file system's 122 request to access the file 108A, the converter 118 sends, transmits, or otherwise presents the payload and metadata of the file 108A with converted permission 120A to the container file system 122. The container file system 122 accesses 122 the payload and metadata of the file 108A based on converted permission 120A. In some examples, the container file system 122 is permitted to access the payload and metadata of the file 108A based on converted permission 120A. In some examples, access is denied. Where access is granted, the container file system 122 may store the payload and metadata of file 108A and the converted permission 120A as file 108B. The stored form of converted permission 120A on container file system 122 may be referred to as converted permission 120B. Thus, file 108B may be comprised of payload, metadata, and converted permission 120B. Converted permission 120B may be identical to second permission 114B. Second permission 114B may be less permissive than third permission 114C1. Thus, the converter 118 presents or provides file 108B with converted permissions 120B to the container file system 122.

In sum, system 100 provides file 108A with third permission 114C2 to local user 116 when the local user 116 accesses file 108A from the host file system 106, and file 108B with converted permission 120B to a user accessing the file 108A from a container file system 122. In some examples, third permission 114C2 may be a shared file permission setting, e.g., mode 755, which allows unprivileged, non-root, or non-owner users to perform one or more operations including to read, write, or execute the file 108A. In some examples, the converted permission 120B may be a private file permission setting, e.g., mode 700, which only allows privileged, root, or owner users to perform one or more of reading, writing, or executing the file 108B.

Nevertheless, the permissions and file modes discussed above and the relationships among the first permission 114A, second permission 114B, third permission 114C1, and third permission 114C2 are illustrative and not meant to be limiting. Any other permissions and relative permissiveness may be used in and among the first permission 114A, second permission 114B, third permission 114C1 and third permission 114C2.

Thus, as between first permission 114A and second permission 114B, in some examples, first permission 114A is more permissive than second permission 114B; in other examples, first permission 114A is less permissive than second permission 114B; and in further examples, first permission 114A is equally as permissive as second permission 114B.

As between first permission 114A and third permission 114C1, in some examples, first permission 114A is more permissive than third permission 114C1; in other examples, first permission 114A is less permissive than third permission 114C1; and in further examples, first permission 114A is equally as permissive as third permission 114C1.

As between second permission 114B and third permission 114C1, in some examples, second permission 114B is more permissive than third permission 114C; in other examples, second permission 114B is less permissive than third permission 114C1; and in further examples, second permission 114B is equally as permissive as third permission 114C1.

As between third permission 114C1 and third permission 114C2, in some examples, third permission 114C1 is more permissive than third permission 114C2; in other examples, third permission 114C1 is less permissive than third permission 114C2; and in further examples, third permission 114C1 is equally as permissive as third permission 114C2.

As between third permission 114C1 and second permission 114B, in some examples, third permission 114C1 is more permissive than second permission 114B; in other examples, third permission 114C1 is less permissive than second permission 114B; and in further examples, third permission 114C1 is equally as permissive as second permission 114B.

As between third permission 114C1 and converted permission 120A, in some examples, third permission 114C1 is more permissive than converted permission 120A; in other examples, third permission 114C1 is less permissive than converted permission 120A; and in further examples, third permission 114C1 is equally as permissive as converted permission 120A.

As between second permission 114B and converted permission 120A, in some examples, second permission 114B is more permissive than converted permission 120A; in other examples, second permission 114B is less permissive than converted permission 120A; and in further examples, second permission 114B is equally as permissive as converted permission 120A.

As between converted permission 120A and converted permission 120B, in some examples, converted permission 120A is more permissive than converted permission 120B; in other examples, converted permission 120A is less permissive than converted permission 120B; and in further examples, converted permission 120A is equally as permissive as converted permission 120B.

Figure 2:
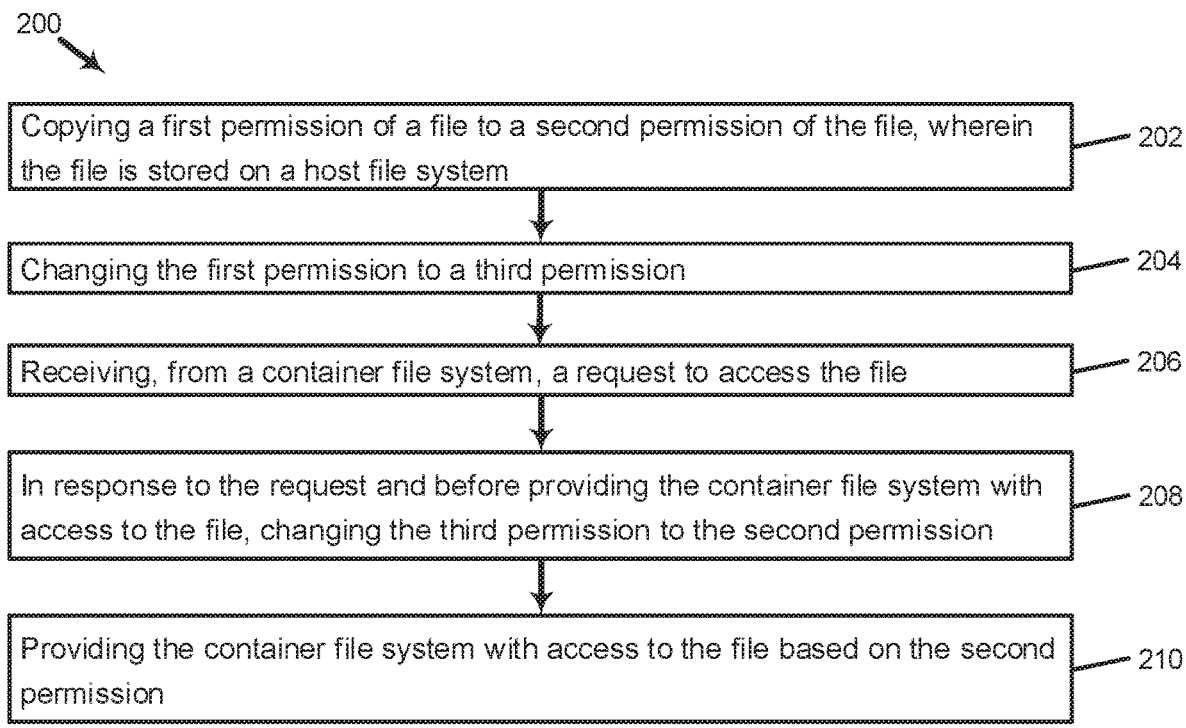
FIG. 2 is a flow diagram illustrating a method for providing a file or directory with a first set of permissions to users accessing the file or directory via a host file system, and a second set of permissions to users accessing the file or directory via a container file system.

FIG. 2 is a flow diagram illustrating a method for providing a file or directory with a first set of permissions to users accessing the file or directory via a host file system, and a second set of permissions to users accessing the file or directory via a container file system, according to aspects of the present disclosure. The method 200 may be performed by non-transitory memory and processors. The non-transitory memory and processors may be provided, for example, by the system 100 described with respect to FIG. 1. Additional steps may be provided before, during, and after the steps of method 200, and some of the steps described may be replaced, eliminated and/or re-ordered for other examples of the method 200. Method 200 may be performed by one or more computer systems described with respect to FIG. 1, acting in concert or individually, for example, over a wired or wireless network, a distributed computing network, a cloud network, etc.

At action 202, a first permission of a file or directory is copied to a second permission of the file or directory. In some examples, the file or directory is stored on the host file system. In some examples, the first permission of the file or directory is stored in the attributes of the file or directory, and the second permission of the file or directory is stored in the extended attributes of the file or directory. In some examples, the first and second permissions are stored in an inode of the host file system. In some examples, the first and second permissions are stored in an attribute or extended attribute in an inode of the host file system.

At action 204, the first permission is changed to a third permission. The third permission may be more, less, or equally as restrictive as the first permission. In some examples, the third permission replaces, overrides, or updates the first permission. In some examples, the third permission is stored in the same location as the first permission. In some examples, the third permission is stored in an inode of the host file system. In some examples, the third permission is stored in the same inode of the host file system as the inode in which the first file permission is or was stored. In some examples, the third permission may be the permission level of the file or directory that is currently applicable to owners, group members, and public users of the file or directory. In some examples, the third permission may allow unprivileged users, such as public users, to read and execute a file or directory. In some examples, the third permission may apply equally to local users of the host file system as to users of container file systems.

At action 206, a request to access the file is received. In some examples, the request may be received from a user of a container. The container user's request may be passed to a container file system. The container file system may include a service that runs on the host file system. The host file system may be provided by a host operating system. The container file system may be provided by a container management system. The container file system may be comprised of the file system of a particular container, the file system of the container management system, or the container management system. The container management system includes software that virtualizes an operating system to deliver software in packages called containers. Containers may be isolated from one another by the container management system using the host operating system's kernel's resource isolation features and a file system capable of union mounting, and may thus appear to be remote from the local host file system. Thus, multiple containers may be run and managed within a single instance of a host operating system by a container management system using a union mount file system.

In line with such isolation, it is desirable to set different permissions for a container user requesting to access a file or directory on the host file system via the container file system as opposed to users accessing the same file or directory via the host file system, so as to permit the users of the host file system to perform more, less, or the same types of operations as users of the container file system. For example, users accessing the file or directory via the host file system may be provided with greater permissions than users accessing the file or directory via the container file system. Such a scheme may allow users of the host file system to, for example, freely read, execute, and share the file or directory and create container images using the file or directory, while preventing container users seeking to access the same file from a container file system from reading, writing, or executing the file or directory.

At action 208, in response to the request from the container file system for a file or directory on the host file system, a converter may read the file's payload and metadata into memory and convert the third permission governing the current level of access to the file by, for example, unprivileged users of the host file system to a second permission stored in the file's or directory's extended attributes. In some examples, the conversion may not actually change the third permission on the host file system, thus access by local users remains unaffected. In some examples, the conversion is performed by reading the payload and metadata of the requested file or directory into memory, and applying a privilege mask other than the third permission to the payload and metadata of the requested file or directory. For example, the converter may read the privilege mask stored in the extended attributes and pass the file with its payload and metadata, along with the privilege mask stored in the extended attributes, to the container file system.

As described above with respect to action 202, the second permission may be a copy of the first permission before the first permission was changed to the third permission. Thus, if the third permission is more permissive than the first permission, then both the first permission and the second permission (which is a copy of the first permission) is less permissive than the third permission, and the effect of changing the third permission to the second permission is that the file or directory will be provided to users of the container file system with more restrictive permissions than to users of the host file system.

In some examples, the converter does not have permission to rewrite files or file permissions on the host file system, so the converter is unable to change the third permission stored in the host file system (e.g., in the inode) to the second permission. As a result of this restriction, the file or directory will still be provided with the third permission to the users of the host file system, while being passed to container users of the container file system with the second permission. Accordingly, where the third permission is more permissive than the first permission, the converter causes the file or directory to be provided with more or greater permissions to users of the host file system and with fewer or lesser permissions to users of the container file system. But in examples where the third permission is less permissive than the first permission, the converter causes the file or directory to be provided with fewer or lesser permissions to users of the host file system and more or greater permissions to users of the container file system. In some examples where the third permission is equally as permissive as the first permission, users of both the host file system and the container file system have the same permissions.

At action 210, the container file system is provided with access to the file based on the second permission. In some examples, the container file system is provided with access to the file based on some other stored permission that is appropriate for a user of the container file system. Such a stored permission may be a default permission level that is applied by the converter to all requests from a container user, container, or container file system. In some examples, the converter provides the file to the container file system after converting the permission (e.g., third permission) currently applicable to a class of users (e.g., unprivileged users) to the appropriate permissions (e.g., second permission, default container permission, etc.) applicable to similarly classified users (e.g., unprivileged users) seeking to access the file or directory via the container file system. In some examples, the third permission is more permissive than the converted or second permission, and allows one or more classes of users to read, write, or execute the file or directory, whereas the second permission does not permit one or more of the foregoing operations. In such examples, users of the host file system, who are provided the file with the third permission, would have more rights than users of the container file system, who are provided the file with the converted or second permission.

In other examples, the converted or second permission is more permissive than the third permission, and allows one or more classes of users to read, write, or execute the file or directory, whereas the third permission does not permit one or more of the foregoing operations. Thus, in such examples, users of the container file system would have more rights than users of the host file system.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
   copying a first restrictive permission of a file to a second restrictive permission of the file, wherein the file is stored on a host file system;
   changing, using a converter, the first restrictive permission to a third less-restrictive permission;
   receiving, from the host file system, a first request to access the file;
   accessing the file through the host file system, the host file system's access being based on the third less-restrictive permission;
   receiving, from a container file system, a second request to access the file;
   in response to the second request and before providing the container file system with access to the file, changing, using the converter, a permission that is used to access the file from the third less-restrictive permission to the second restrictive permission; and
   accessing the file through the container file system, the container file system's access being based on the second restrictive permission, wherein the container file system is executing in an operating environment that is isolated from an operating environment of the host file system.

2. The method of claim 1, wherein the first restrictive permission includes a permission that prevents unprivileged users from reading, edit, or executing the file.

3. The method of claim 1, wherein the first restrictive permission is the same as the second restrictive permission.

4. The method of claim 1, wherein the first restrictive permission is different from the third less-restrictive permission.

5. The method of claim 1, wherein the third less-restrictive permission includes a permission that allows unprivileged users to read, edit, or execute the file.

6. The method of claim 1, wherein the storing the first restrictive permission as the second restrictive permission includes storing the second permission as an extended attribute of the file.

7. The method of claim 1, wherein the changing the permission that is used to access the file from the third less-restrictive permission to the second restrictive permission is performed by the host file system.

8. The method of claim 1, wherein the container file system executes on the host file system.

9. The method of claim 1, further comprising receiving a request from a local user of the host file system to access the file.

10. The method of claim 9, wherein the file provided to the local user has a different attribute than the file provided to the container file system.

11. The method of claim 10, wherein the file is provided to a local user of the host file system using the third less-restrictive permission.

12. The method of claim 11, wherein the local user is an unprivileged user, and wherein the unprivileged user is permitted to read and execute the file based on the third less-restrictive permission.

13. The method of claim 12, wherein the unprivileged user is able to read but unable to execute the file based on the second restrictive permission.

14. The method of claim 10, wherein as a result of the third less-restrictive permission, the file is readable and executable by privileged users and unprivileged users of the host file system, and as a result of the second restrictive permission, the file is non-executable by users of the container file system.

15. The method of claim 14, wherein a local and unprivileged user of the host file system creates an image based on the file that is already present in the host file system.

16. The method of claim 15, wherein as a result of the second restrictive permission, an unprivileged user of the container file system is not permitted to create an image using the file that is already present in the host file system.

17. The method of claim 16, wherein in response to the underprivileged user of the container file system not being permitted to create an image using the file that is already present in the host file system, copying the file and creating an image based on a copy of the file.

18. A system comprising:
   a non-transitory memory; and
   one or more hardware processors coupled to the non-transitory memory to execute instructions from the non-transitory memory to perform operations comprising:
      storing a file with a first restrictive permission in a host file system;
      creating an extended attribute corresponding to the file and storing a second restrictive permission in the extended attribute, wherein the second restrictive permission is equivalent to the first restrictive permission;
      changing, using a converter, the first restrictive permission to a third less-restrictive permission, wherein the first restrictive permission and the third less-restrictive permission are different;
      receiving a first request from a first requester using the host file system to access the file;
      in response to the first request, accessing the file, by the first requester, through the host file system, the host file system's access being based on the third less-restrictive permission;
      receiving a second request from a second requester using a container file system to access the file;
      before providing the file to the second requester, changing, using a converter, a permission that is used to access the file from the third less-restrictive permission to the stored second restrictive permission; and
      in response to the second request, accessing the file, by the second requester, through the container file system, the container file system's access being based on the second restrictive permission, wherein the container file system is executing in an operating environment that is isolated from an operating environment of the host file system.

19. A non-transitory machine-readable medium having stored thereon machine-readable instructions executable to cause at least one machine to perform operations comprising:
   creating an extended attribute of a file stored in a host file system and storing a second restrictive permission in the extended attribute, wherein the second restrictive permission is copied from a first restrictive permission associated with the file;
   changing, using a converter, the first restrictive permission to a third less-restrictive permission;
   in response to receiving a request from a user of the host file system to access the file, accessing the file through the host file system, the host file system's access being based on the third less-restrictive permission; and
   in response to receiving a request from a user of a container file system to access the file, changing, using the converter, a permission that is used to access the file from the third less-restrictive permission to the second restrictive permission without writing to the third less-restrictive permission, such that the user of the container file system accesses the file through the container file system, the container file system's access being based on the second restrictive permission, wherein the container file system is executing in an operating environment that is isolated from an operating environment of the host file system.

* * * * *